United States Patent
Vajravel et al.

(10) Patent No.: US 11,874,722 B2
(45) Date of Patent: Jan. 16, 2024

(54) APPLYING MODERN STANDBY CONFIGURATIONS ON A PER-APPLICATION BASIS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 17/391,650

(22) Filed: Aug. 2, 2021

(65) Prior Publication Data
US 2023/0033478 A1 Feb. 2, 2023

(51) Int. Cl.
| G06F 1/32 | (2019.01) |
| G06F 9/48 | (2006.01) |
| G06F 11/30 | (2006.01) |
| G06F 1/3234 | (2019.01) |
| G06F 1/329 | (2019.01) |
| G06F 1/324 | (2019.01) |

(52) U.S. Cl.
CPC ............. G06F 1/325 (2013.01); G06F 1/324 (2013.01); G06F 1/329 (2013.01); G06F 9/4893 (2013.01); G06F 11/3051 (2013.01)

(58) Field of Classification Search
CPC .......... G06F 1/325; G06F 1/324; G06F 1/329; G06F 9/4893; G06F 11/3052
See application file for complete search history.

(56) References Cited

U.S. PATENT DOCUMENTS

| 2013/0042128 A1* | 2/2013 | Berry .................... G06F 1/3209 713/323 |
| 2013/0042246 A1* | 2/2013 | Berry .................... G06F 1/3209 718/102 |
| 2014/0136869 A1* | 5/2014 | Sadowski ............. G06F 1/3212 713/323 |
| 2017/0300103 A1* | 10/2017 | Wei ........................ G06F 1/3228 |
| 2017/0324633 A1* | 11/2017 | Lehner ................ H04L 43/0876 |
| 2021/0311527 A1* | 10/2021 | Sumikawa ............ G06F 1/3212 |
| 2022/0035438 A1* | 2/2022 | He .......................... G06F 1/3228 |
| 2022/0066530 A1* | 3/2022 | Nakamura ............... G06F 1/206 |
| 2023/0114256 A1* | 4/2023 | Hsia ....................... G06F 1/3234 713/323 |

* cited by examiner

*Primary Examiner* — Jaweed A Abbaszadeh
*Assistant Examiner* — Cheri L Harrington
(74) *Attorney, Agent, or Firm* — Kirton McConkie; Brian Tucker

(57) ABSTRACT

Modern Standby configurations can be applied on a per-application basis. When a system is transitioning into Modern Standby, a host service can select a Modern Standby configuration to be applied to each Modern Standby capable application. The host service can then create job objects, or other suitable structures or functionality, to cause the selected Modern Standby configurations to be applied to the Modern Standby capable applications while the system is in Modern Standby. In this way, even though the operating system may implement Modern Connected Standby for all Modern Standby capable applications, dynamically selected Modern Standby configurations can be applied to mimic Modern Disconnected Standby or suspension for at least some of the Modern Standby capable applications.

20 Claims, 9 Drawing Sheets

Per-Application Configuration Policy 300

| Application | Configuration |
|---|---|
| Outlook | Connected |
| Zoom | Connected |
| Adobe Reader | Suspend |
| MS Word | Disconnected |
| ... | |

*FIG. 3A*

Per-Application Configuration Policy 301

| Application | Sensor State | Configuration |
|---|---|---|
| Outlook | RSoC > 20% | Connected |
| Outlook | RSoC < 20% | Disconnected |
| Zoom | Any | Connected |
| Adobe Reader | RSoC > 40% | Disconnected |
| Adobe Reader | RSoC < 40% | Suspend |
| ... | | |

*FIG. 3B*

APPLYING MODERN STANDBY CONFIGURATIONS ON A PER-APPLICATION BASIS

CROSS-REFERENCE TO RELATED APPLICATIONS

N/A

BACKGROUND

Modern Standby is a power model for systems running the Windows operating system and is intended to provide an instant on/instant off experience similar to a smartphone. A system may transition from the on state (e.g., when the screen is on) to Modern Standby for a number of reasons (e.g., when the user presses the power button, closes a laptop or selects Sleep from the Windows Start menu, when the system idles out, etc.). Many of the details of how the operating system implements Modern Standby are beyond the scope of this disclosure. Of relevance, however, is that supported applications may periodically become active during Modern Standby. For example, an email application may become active to process an incoming email without waking the system from Modern Standby.

Currently, the Windows operating system only provides Modern Standby support to Universal Windows Platform (UWP) applications. In other words, any application that is not a UWP application, such as a desktop application or web/browser-based application, will remain suspended for the duration of Modern Standby. Additionally, if a UWP application is run in a container on the system, Modern Standby will no longer be enabled for the UWP application. Containerization in the software context refers to a technique for packaging an application and its dependencies into a container to abstract/isolate the application from the underlying host operating system and environment. A number of containerization techniques exist.

FIG. 1 is intended to represent a system 100 that supports Modern Standby. As shown, the operating system running on system 100 may include, among other components, a desktop activity moderator (DAM) driver 111 (e.g., DAM.sys in Windows) and a process/image load notifier 112 (or load notifier 112). FIG. 1 also shows that there are four applications, applications 120-1 through 120-4 (or application(s) 120), running on system 100. It is assumed that applications 120-1 and 120-3 are UWP applications while applications 120-2 and 120-4 are not. Applications 120-3 and 120-4, with the associated binaries/libraries 131a and 132a, are also run within containers 131 and 132 respectively.

As part of the DAM phase of Modern Standby, the Windows operating system suspends all non-UWP applications. In particular, when the system is active, DAM driver 111 interfaces with load notifier 112 to identify any application that is loaded. For any non-UWP application that is loaded or any UWP application that is deployed in a container, DAM driver 111 can assign the application to a suspend job object. In contrast, for any UWP application that is loaded, DAM driver 111 can assign the application to a throttle job object. Then, during the DAM phase, all applications identified in the suspend job object will be suspended for the duration of Modern Standby, whereas any application identified in the throttle job object will remain running at reduced activity. Therefore, any desktop application or any application deployed in a container will be assigned to the suspend job object and, as a result, will be suspended during Modern Standby.

Accordingly, after Modern Standby has transitioned through the DAM phase, application 120-2, as a desktop application running on the operating system, will be suspended. Applications 120-3 and 120-4 will also be suspended because the operating system will view their containers 131 and 132 as desktop applications. For example, if containers 131 and 132 are Docker containers, load notifier 112 will only see the process dockerd.exe rather than application 120-3's and application 120-4's executables. As a result, even though application 120-3 is a UWP application, it will be suspended during the DAM phase. As can be seen, even though system 100 implements Modern Standby, a limited subset of applications will benefit from it.

U.S. patent application Ser. No. 17/195,383, which is incorporated herein by reference, describes techniques for enabling Modern Standby for unsupported applications. Even with such techniques, Modern Standby still has a number of limitations. Modern Standby includes both Modern Connected Standby (MCS) and Modern Disconnected Standby (MDS). When MCS is implemented, the network device remains operational thereby enabling supported applications (i.e., those that are placed in the throttle job object) to perform network activities when they periodically become active. In contrast, when MDS is implemented, supported applications will not have network connectivity even when they periodically become active.

Although an administrator can choose between MCS or MDS, the choice is system-wide. For example, if the system is configured to implement MCS, all non-suspended applications (i.e., all applications in the throttle job object) will have network connectivity and therefore will be able to perform network activities when they become active. This can lead to excessive and unnecessary power consumption. On the other hand, if the system is configured to implement MDS, none of the non-suspended applications will have network connectivity when they become active. Although this would reduce power consumption, it would degrade the user experience. For example, a teleconferencing application would be unable to wake the system in response to an incoming call and an email application would be unable to receive/retrieve incoming emails until the system exits Modern Standby. In short, there is no option to provide per-application Modern Standby configurations.

BRIEF SUMMARY

The present invention extends to systems, methods and computer program products for applying Modern Standby configurations on a per-application basis. When a system is transitioning into Modern Standby, a host service can select a Modern Standby configuration to be applied to each Modern Standby capable application. The host service can then create job objects, or other suitable structures or functionality, to cause the selected Modern Standby configurations to be applied to the Modern Standby capable applications while the system is in Modern Standby. In this way, even though the operating system may implement Modern Connected Standby for all Modern Standby capable applications, dynamically selected Modern Standby configurations can be applied to mimic Modern Disconnected Standby or suspension for at least some of the Modern Standby capable applications.

In some embodiments, the present invention may be implemented as a method for applying Modern Standby configurations on a per-application basis. A host service can detect that a system is transitioning into Modern Standby. The host service can select a Modern Standby configuration for each of a plurality of Modern Standby capable applications that are running on the system. The host service can cause the selected Modern Standby configurations to be applied to the Modern Standby capable applications while the system is in Modern Standby.

In some embodiments, the present invention may be implemented as computer storage media storing computer executable instructions which when executed implement a method for applying Modern Standby configurations on a per-application basis. A host service can identify a plurality of Modern Standby capable applications that are running on a system. The host service can select a connected configuration for a first set of the Modern Standby capable applications, a disconnected configuration for a second set of the Modern Standby capable applications and a suspended configuration for a third set of the Modern Standby capable applications. The host service can then cause the connected configuration, the disconnected configuration and the suspended configuration to be applied to the first set, the second set and the third set respectively while the system is in Modern Standby.

In some embodiments, the present invention may be implemented as a system that includes one or more processors and computer storage media storing computer executable instructions which when executed implement a method for applying Modern Standby configurations on a per-application basis. A host service can access a throttle job object to identify Modern Standby capable applications. The host service can create a disconnected child job object and a suspended child job object. The host service can assign a first set of the Modern Standby capable applications to the disconnected child job object to thereby limit bandwidth available to the first set during Modern Standby. The host service can assign a second set of the Modern Standby capable applications to the suspended child job object to thereby limit CPU time available to the second set during Modern Standby.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A and 3B provide examples of how policies may be configured in one or more embodiments of the present invention;

DETAILED DESCRIPTION

In this specification and the claims, the term "Modern Standby" will be used in accordance with its standard definition in the Windows operating system context and encompasses Modern Connected Standby (MCS) and Modern Disconnected Standby (MDS). However, the present invention can be implemented on systems running other operating systems, and therefore, Modern Standby can be construed as a sleep state in which the system periodically wakes to perform software activities (e.g., the S0ix states on an Intel architecture).

Although the description employs Windows-based examples and terminology, embodiments of the present invention should not be construed as being limited to implementation on Windows-based systems. To the contrary, other operating systems (e.g., Android and Linux) include components that are functionally similar or equivalent to the Windows-based components described herein. Therefore, the techniques described herein, by which embodiments of the present invention enable Modern Standby configurations to be applied on a per-application basis, can be implemented in any operating system environment that supports Modern Standby functionality.

Figure 1:
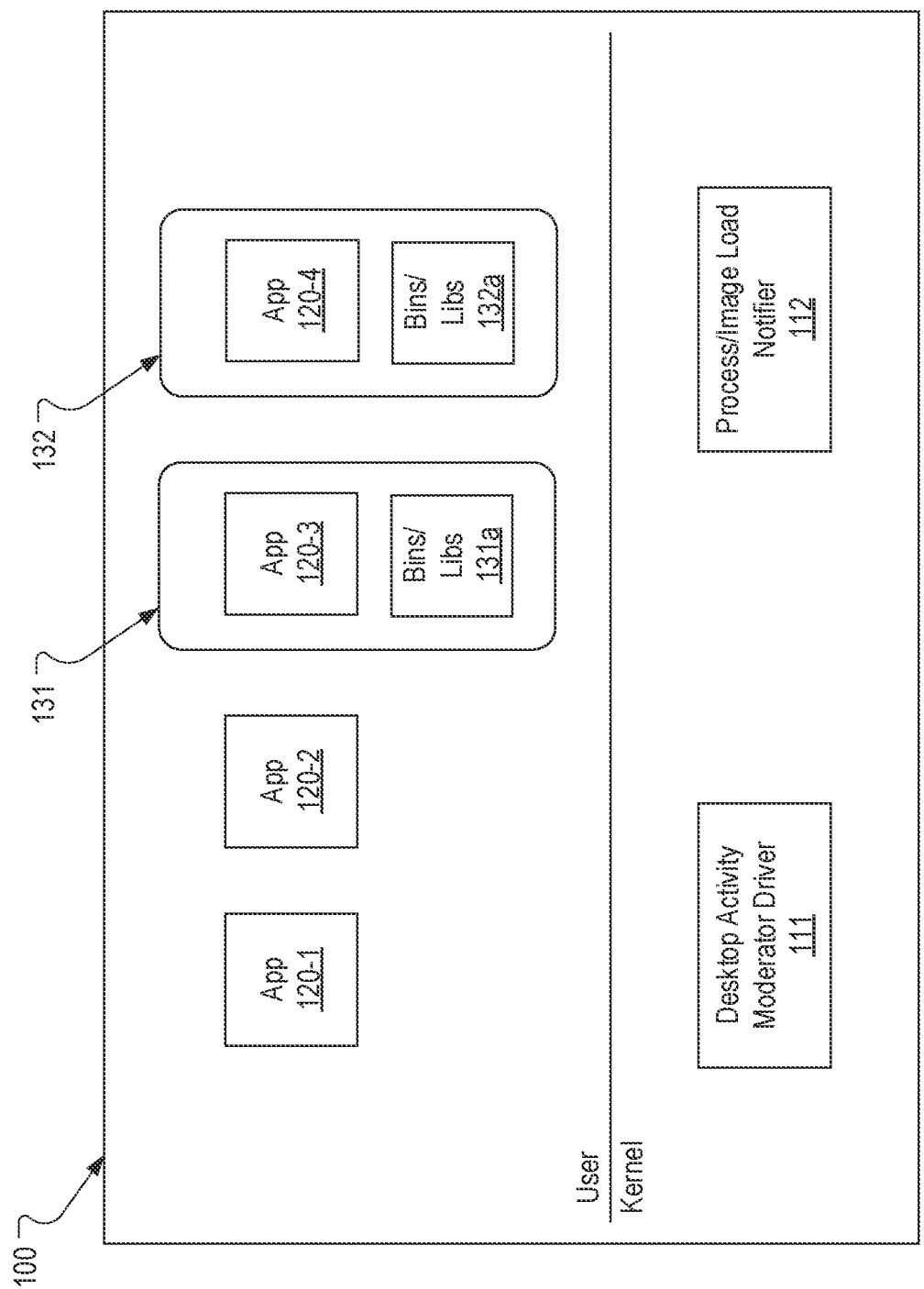
FIG. 1 provides an example of a system that enables Modern Standby for supported applications.
Figure 2:
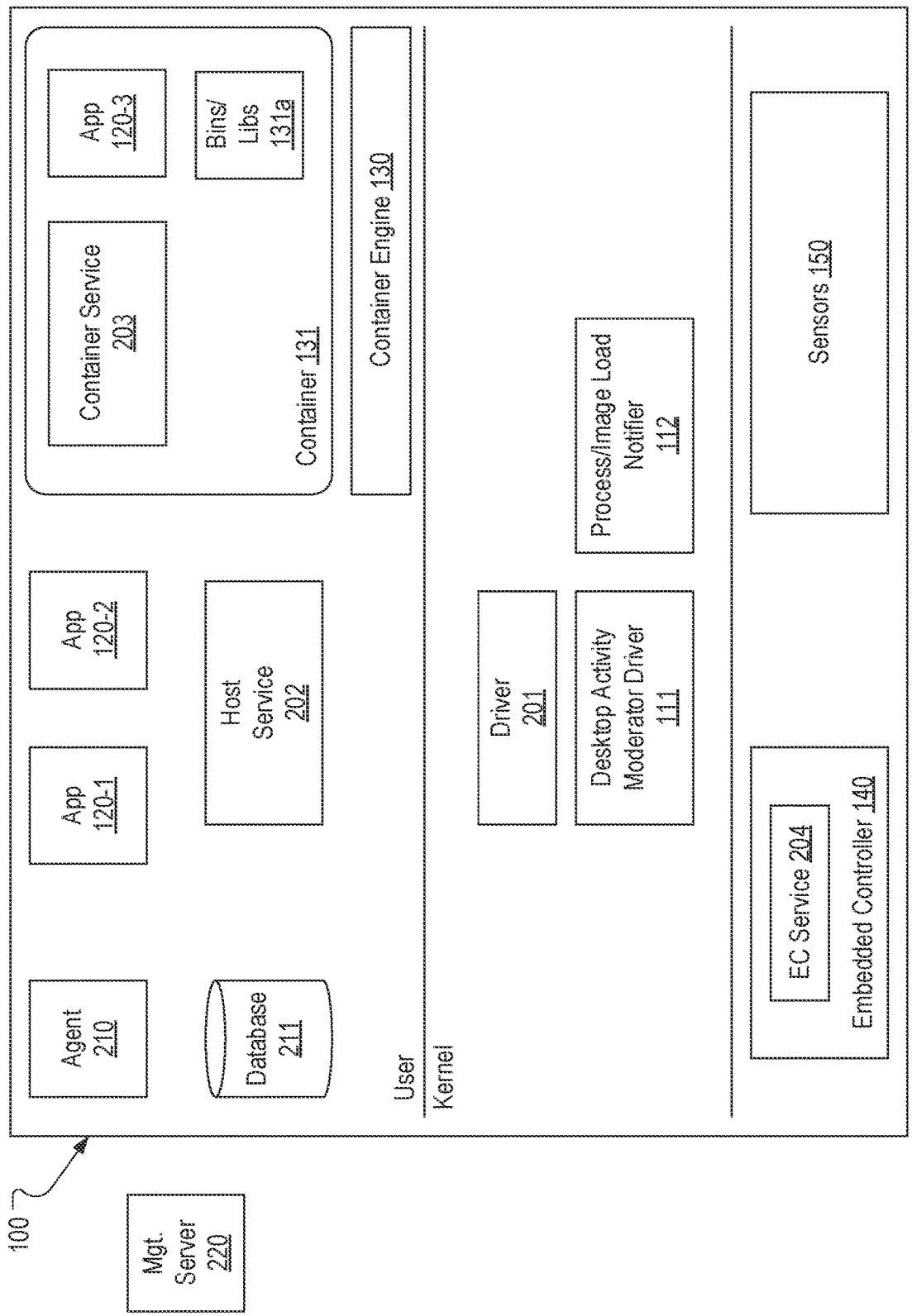
FIG. 2 provides an example of various components that can be included on a system to enable Modern Standby configurations to be applied on a per-application basis.

FIG. 2 provides an example of various components that can be employed on system 100 to enable Modern Standby configurations to be applied on a per-application basis. As introduced in the background, the operating system on system 100 can include DAM driver 111 and load notifier 112. A number of applications 120 can also be run on system 100 including, in this example, applications 120-1 through 120-3, all of which are assumed to be "Modern Standby capable" applications (i.e., the operating system will not automatically suspend these applications when entering Modern Standby). In the case of application 120-3, which runs within container 131, Modern Standby support may be provided in accordance with the techniques of U.S. patent application Ser. No. 17/195,383. Although not shown, one or more applications 120 that are not Modern Standby capable may also be running on system 100.

As introduced in the background, when entering Modern Standby, the operating system may be configured to implement either MCS or MDS. Therefore, any of applications 120 that are not suspended during Modern Standby will run during Modern Standby under the same configuration—either MCS or MDS. Embodiments of the present invention may be implemented to enable each Modern Standby capable application to run during Modern Standby with either a connected configuration or a disconnected configuration. Also, in some embodiments, a Modern Standby capable application can be configured with a suspended configuration. This ability to apply Modern Standby configurations on a per-application basis can increase battery life with minimal impact on responsiveness or performance.

In accordance with embodiments of the present invention and to enable Modern Standby configurations to be applied on a per-application basis, system 100 can include a driver 201 (which may be a kernel-mode component on some operating systems), a host service 202 (which may be a user-mode component on some operating systems), a container service 203 for any container that may be created on system 100 and an embedded controller (EC) service 204 that runs on an embedded controller 140 or other component that interfaces with sensors 150 of system 100. Sensors 150 can represent a component that reports a battery's remaining capacity, a component that reports the existence or status of a network connection, a component that reports location information (e.g., geofence information), or any other component that may provide information relevant to determining which Modern Standby configuration should be applied to an application.

In some embodiments, container service 203 can be a background service that is bundled and deployed with any application and its binaries/libraries that are deployed in a container (i.e., an instance of container service 203 may run in any container created on system 100). Although FIG. 2 shows a single container 131 that a container engine 130 has created, multiple containers, including multiples types of containers (e.g., hardware and software containers), may exist on system 100 and may include an instance of container service 203. In some embodiments, an agent 210 and database 211 may also be included on system 100, and agent 210 may interface with a management server 220.

In some embodiments, driver 201, host service 202 and container service 203 may be configured to perform the functionality described in U.S. patent application Ser. No. 17/195,383 for the similarly labeled components to thereby enable Modern Standby for containerized applications. However, embodiments of the present invention could be implemented without using the techniques of U.S. patent application Ser. No. 17/195,383. For example, embodiments of the present invention could be implemented to apply Modern Standby configurations on a per-application basis only to non-containerized applications.

FIGS. 3A and 3B provide examples of per-application configuration policies 300 and 301 (or policies 300 and 301) that could be used in one or more embodiments of the present invention. As shown, policy 300 can identify applications that may run on system 100 and can define a configuration for each of the applications. For example, policy 300 defines a connected configuration for Outlook and Zoom, a suspended configuration for Adobe Reader and a disconnected configuration for MS Word. Policy 301 also identifies applications that may run on system 100 but defines one or more configurations for each application that are based on sensor state information. In this context, the term "sensor state information" can represent any information that EC service 204 may relay about sensors 150 and may oftentimes include a remaining battery charge (RSoc), a network status, location information, etc. For example, policy 301 defines a connected state for Outlook when the battery charge is greater than 20% and a disconnected state for Outlook when the battery charge is less than 20%. Accordingly, FIGS. 3A and 3B are intended to represent that per-application configurations could be defined based on different types of information and with various levels of granularity. In some embodiments, the configurations may be selected from among connected, disconnected and suspended to mimic the MCS, MDS and suspended states that the operating system may implement. In some embodiments, agent 210 may be configured to obtain policy 300 or policy 301 from management server 220. In other embodiments, a machine learning solution may dynamically generate the content of a policy based on performance, usage or other characteristics of system 100.

Figure 4A:
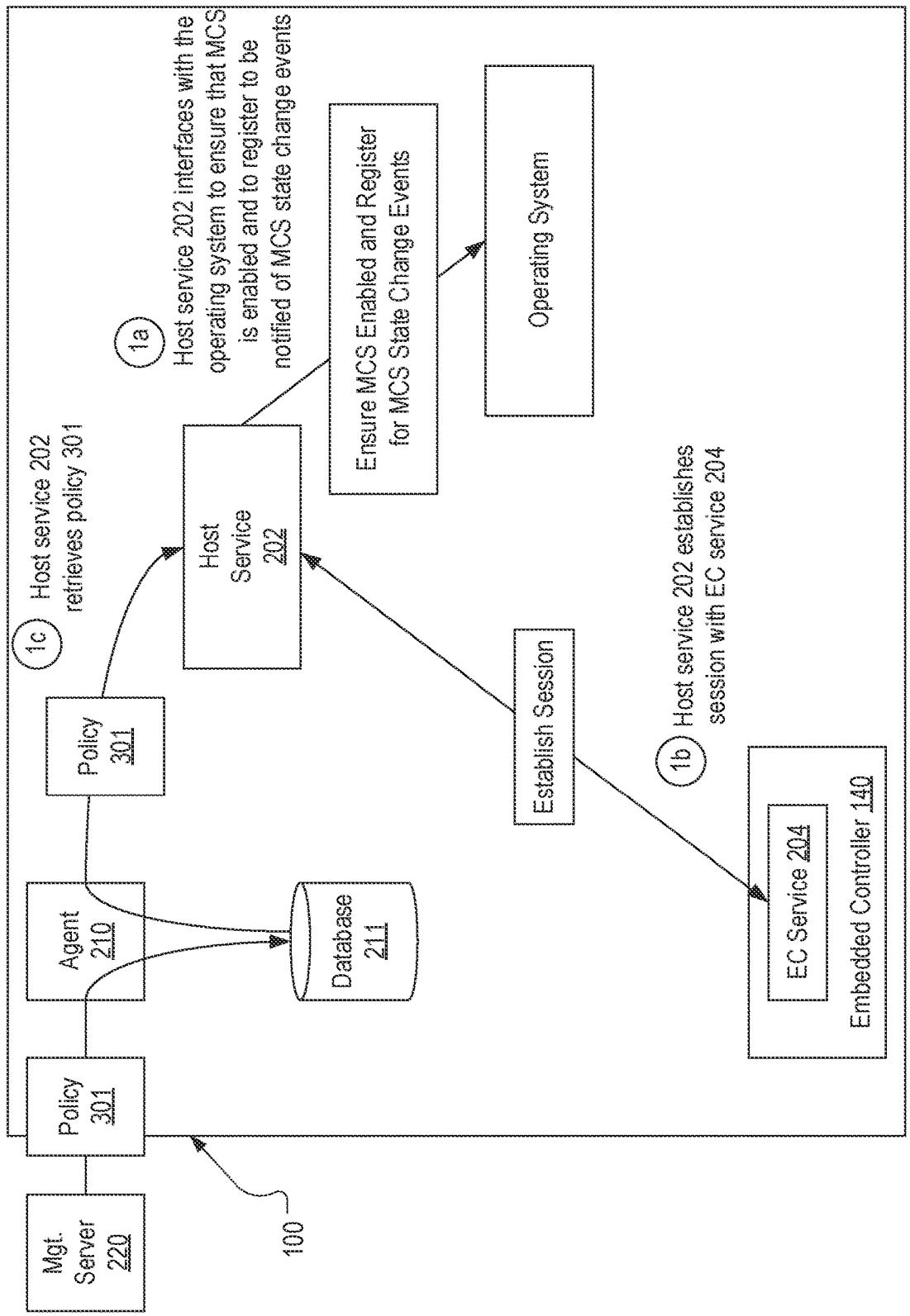
FIGS. 4A and 4B provide an example of functionality that a host service may perform in one or more embodiments prior to a system transitioning into Modern Standby to thereby enable Modern Standby configurations to be applied on a per-application basis.

FIGS. 4A-5D provide an example of how Modern Standby configurations may be applied on a per-application basis in accordance with one or more embodiments of the present invention. FIGS. 4A and 4B represent functionality that may be performed as part of initialization and/or periodically in preparation for the system entering Modern Standby. FIGS. 5A-5D represent functionality that may be performed to ensure that Modern Standby configurations are applied on a per-application basis, and, in some embodiments, such functionality may be performed during one or more active phases of Modern Standby (e.g., between the maintenance and resiliency phases).

Figure 4B:
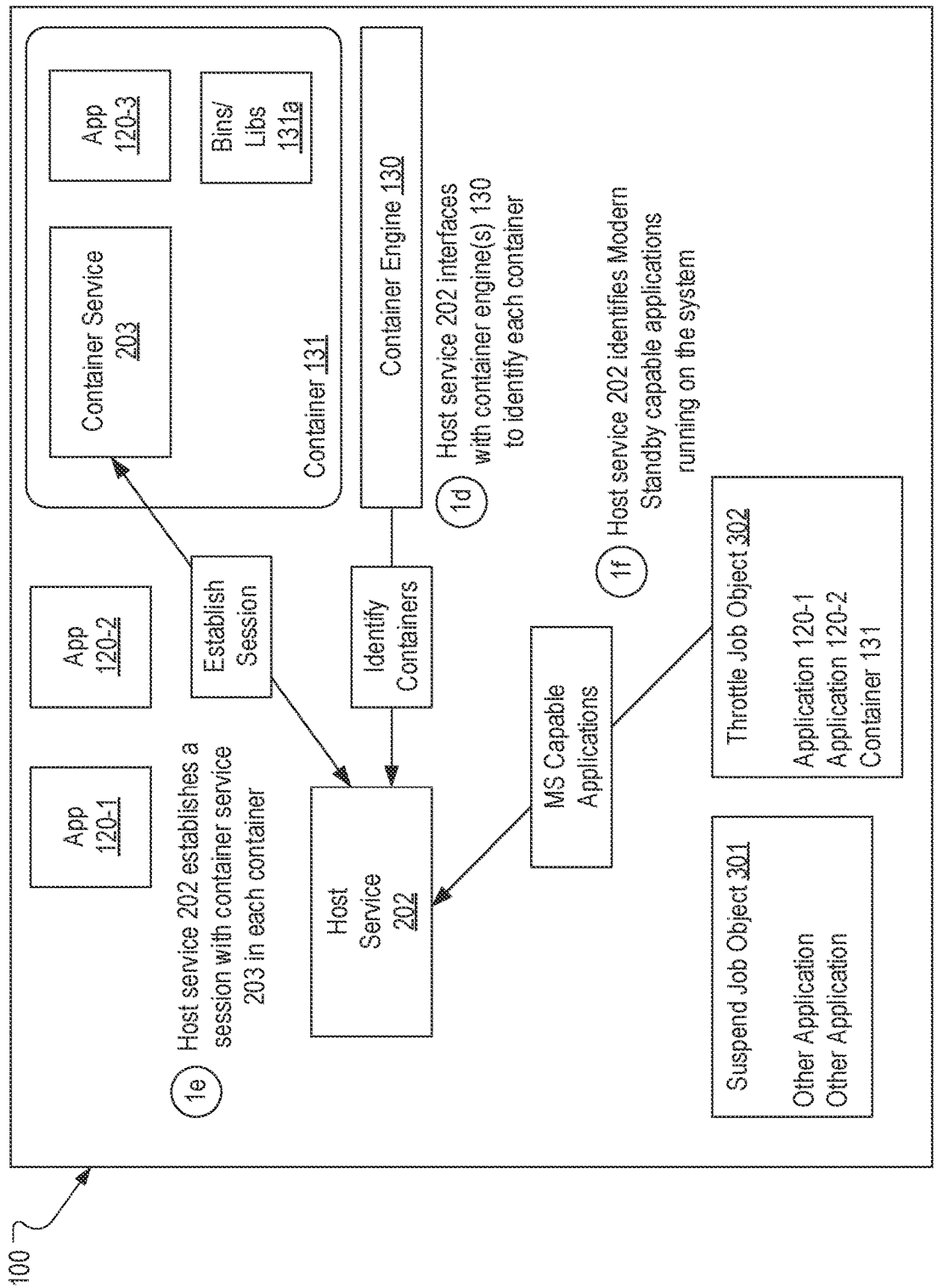

Turning to FIGS. 4A and 4B, it is assumed that host service 202 has been loaded on system 100. As part of being loaded (or at any other suitable time), host service 202 can perform functionality to prepare for the system entering Modern Standby. In FIGS. 4A and 4B, some of this functionality is depicted as steps 1a-1f. These steps need not be performed in any particular order.

Turning to FIG. 4A, in step 1a, host service 202 may interface with the operating system on system 100 to ensure that MCS is enabled (e.g., via the Powercfg command) and to register to be notified of MCS state change events (e.g., to know when Modern Standby transitions between phases). In step 1b, host service 202 can establish a session with EC service 204. For example, host service 202 may use WMI/ACPI interfaces to register with EC service 204 to receive sensor state information when the state of sensors 150 changes (e.g., to receive the RSoC when it falls below a threshold).

In step 1c, host service 202 can retrieve policy 301 (or any applicable policy). For example, in some embodiments, agent 210 may be configured to retrieve policy 301 from management server 220 and store it in database 211. In such cases, host service 202 may retrieve policy 301 from agent 210 or directly from database 211. In some embodiments, agent 210 could receive policy 301 through local input. In some embodiments, agent 210 could receive policy 301 from a machine learning solution that dynamically generates policy 301's content using performance, usage or other information of system 100 that agent 210 may provide. In short, policy 301 could be generated and provided to host service 202 in many different ways.

Turning to FIG. 4B, in step 1d, host service 202 may interface with container engine 130 (and any other container engine/manager on system 100) to identify each container that exists on system 100. For example, host service 130 could obtain an IP address for container 131 and for any other container that may have been launched on system 100. In step 1e, host service 202 can establish a session with the instance of container service 203 running in each container. For example, using the IP address of container 131 that it received from container engine 130, host service 202 can establish a session with container service 203 running in container 131.

In FIG. 4B, it is assumed that a suspend job object 301 and a throttle job object 302 have been populated. As introduced in the background, DAM driver 111 is configured to assign any MS-capable application to throttle job object 302 and any non-MS-capable application to suspend job object 301. For purposes of this example, it is assumed that applications 120-1 through 120-3 are each MS-capable while other applications running on system 100 are not. Using the techniques of U.S. patent application Ser. No. 17/195,383, driver 201 can ensure that each of applications 120-1 through 120-3 are added to throttle job object 302 even though application 120-3 is running in container 131. However, embodiments of the present invention can be implemented regardless of how applications are populated into these objects. In any case, in step 1f, host service 202 can identify MS-capable applications that are running on system 100. For example, host service 202 could call the QueryInformationJobObject function to retrieve the JOBOBJECT_BASIC_PROCESS_ID_LIST structure for throttle job object 302. This structure would contain the process ID of any application that has been added to throttle job object 302. Therefore, host service 202 could use the process IDs to identify applications 120-1 through 120-3 (e.g., by using the process IDs to obtain the names of the applications). Notably, in the case of application 120-3, host service 202 can communicate with container service 203 in container 131 to identify application 120-3 as described in U.S. patent application Ser. No. 17/195,383. In some embodiments, host service 202 can be configured to repeatedly perform steps 1*d*-1*f* (e.g., as additional containers are deployed and/or new applications are loaded).

Figure 5A:
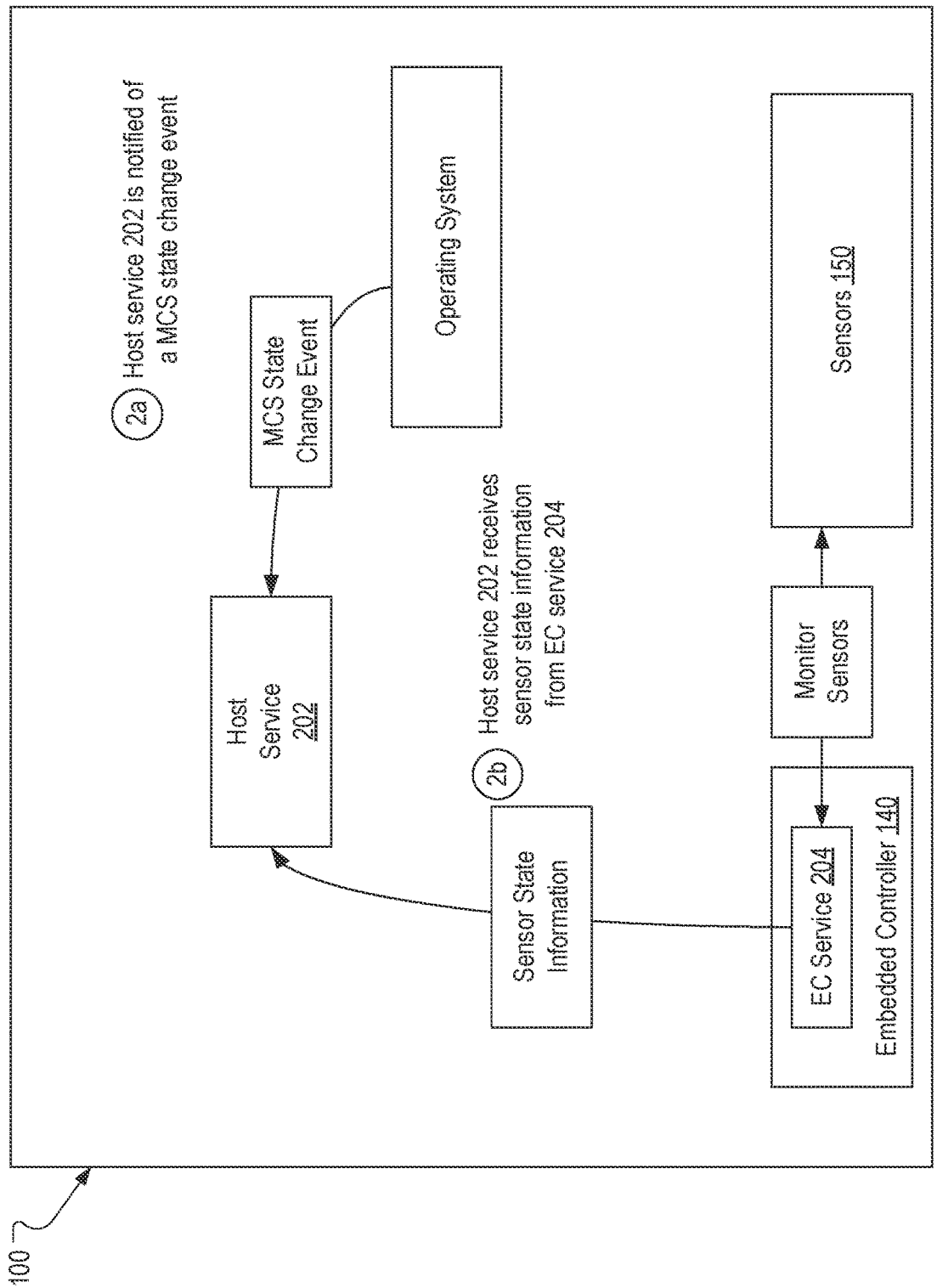
FIGS. 5A-5D provide an example of functionality that a host service may perform in one or more embodiments as a system transitions into Modern Standby to apply Modern Standby configurations on a per-application basis.

FIGS. 5A-5D continue the example of FIGS. 4A and 4B and represent functionality that host service 202 can perform in preparation for or as part of system 100 entering Modern Standby. Turning to FIG. 5A, in step 2*a*, it is assumed that host service 202 is notified of a MCS state change event. For example, the operating system could notify host service 202 that it is preparing system 100 to enter Modern Standby. In some embodiments, step 2*a* could entail detecting that system 100 is transitioning from the maintenance phase to the resiliency phase of Modern Standby. In step 2*b*, and in response to detecting this MCS state change event, host service 202 can obtain sensor state information from EC service 204. As examples only, this sensor state information could identify the remaining battery charge, a type or status of a network connection, location information, etc.

Figure 5B:
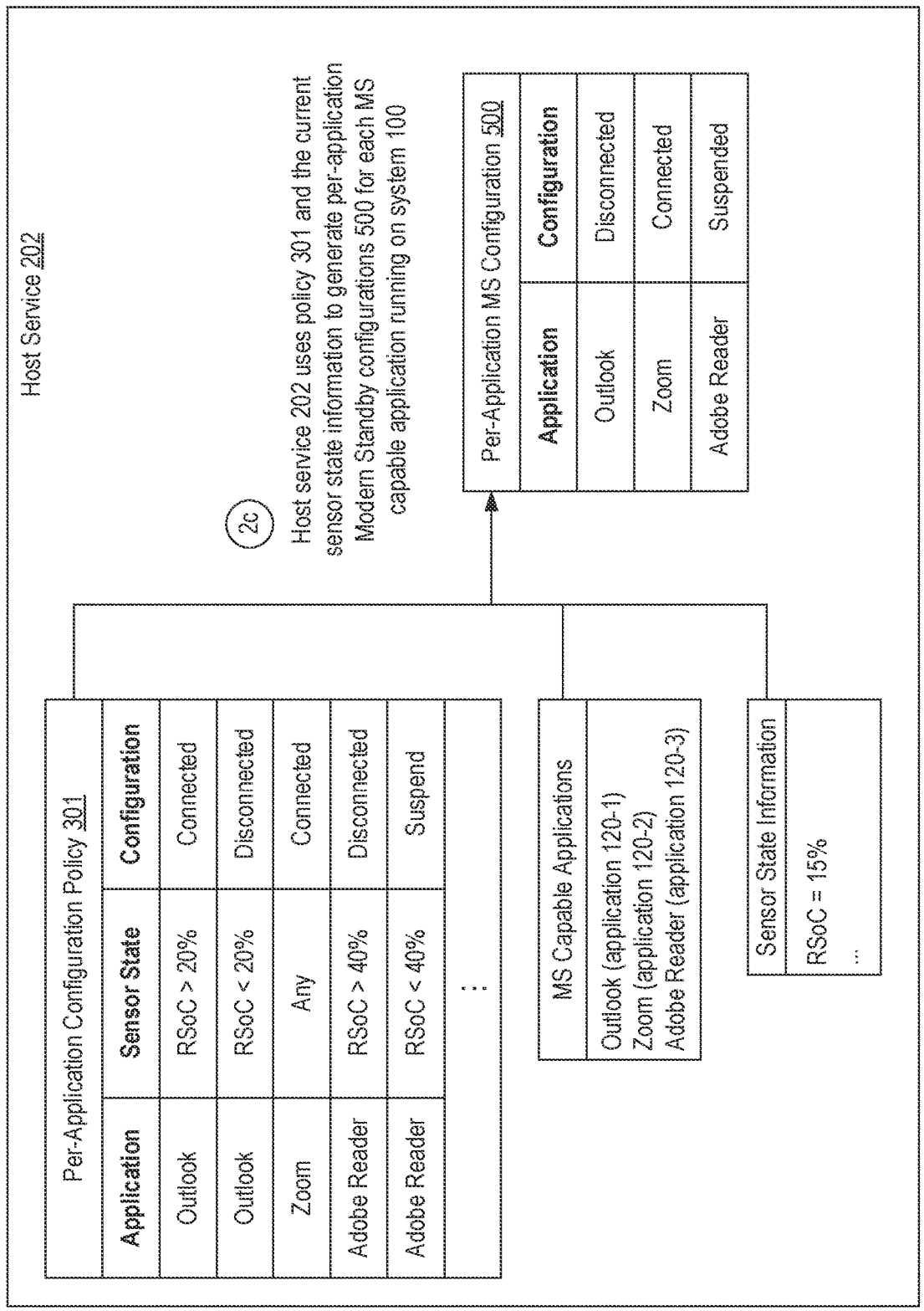

Turning to FIG. 5B, in step 2*c*, host service 202 can use policy 301 that it obtained in step 1*c*, the list of MS capable applications that it obtained in step 1*f* and the sensor state information it obtained in step 2*b* to determine a per-application MS configuration 500 for each MS-capable application. In other words, for each application that is included in throttle job object 302, host service 202 can select a MS configuration based on policy 301 and the current sensor state information. In the depicted example, host service 202 selects a disconnected configuration for Outlook, a connected configuration for Zoom and a suspended configuration for Adobe Reader.

Figure 5C:
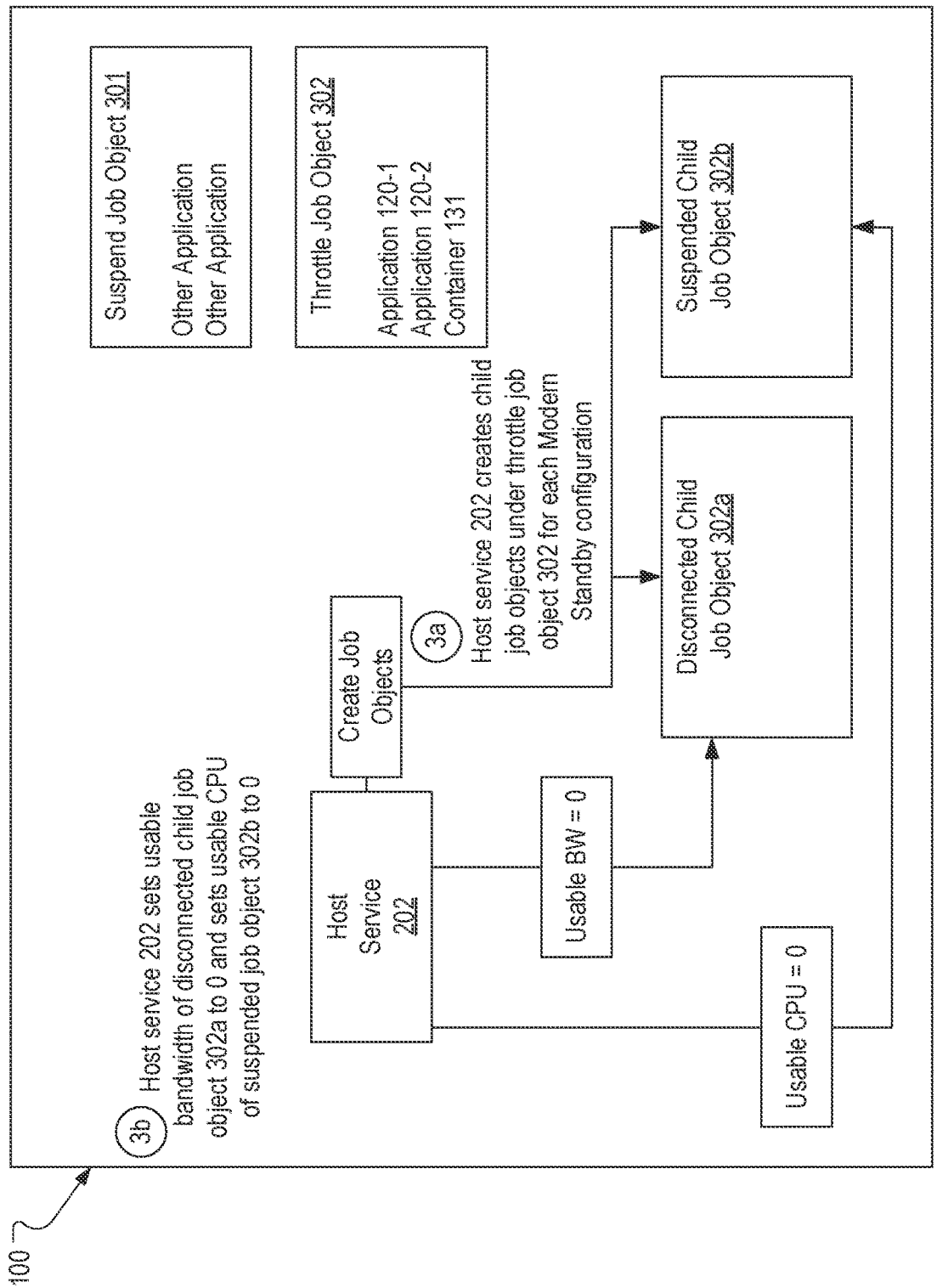

Turning to FIG. 5C, in step 3*a*, host service 202 can create a disconnected child job object 302*a* and a suspended child job object 302*b* under throttle job object 302. For example, host service 202 could call the CreateJobObject function. In step 3*b*, host service 202 can set bandwidth and CPU limits for disconnected child job object 302*a* and suspended child job object 302*b* respectively. In particular, host service 202 can set a bandwidth limit for disconnected child job object 302*a* that prevents processes assigned to disconnected child job object 302*a* from using network bandwidth. For example, host service 202 could call the SetInformationJobObject function and pass a JOBOBJECT_NET_RATE_CONTROL_INFORMATION structure with the MaxBandwidth member set to 0. In some embodiments, rather than using disconnected child job object 302*a* to block an application's network access, host service 202 may use an NDIS filter driver or a firewall configuration. Host service 202 can set a CPU limit for suspended child job object 302*b* that limits the CPU usage of processes assigned to suspended child job object 302*b*. For example, host service 202 could call the SetInformationJobObject function and pass a JOBOBJECT_CPU_RATE_CONTROL_INFORMATION structure with the CPURate member set to a minimum value.

Figure 5D:
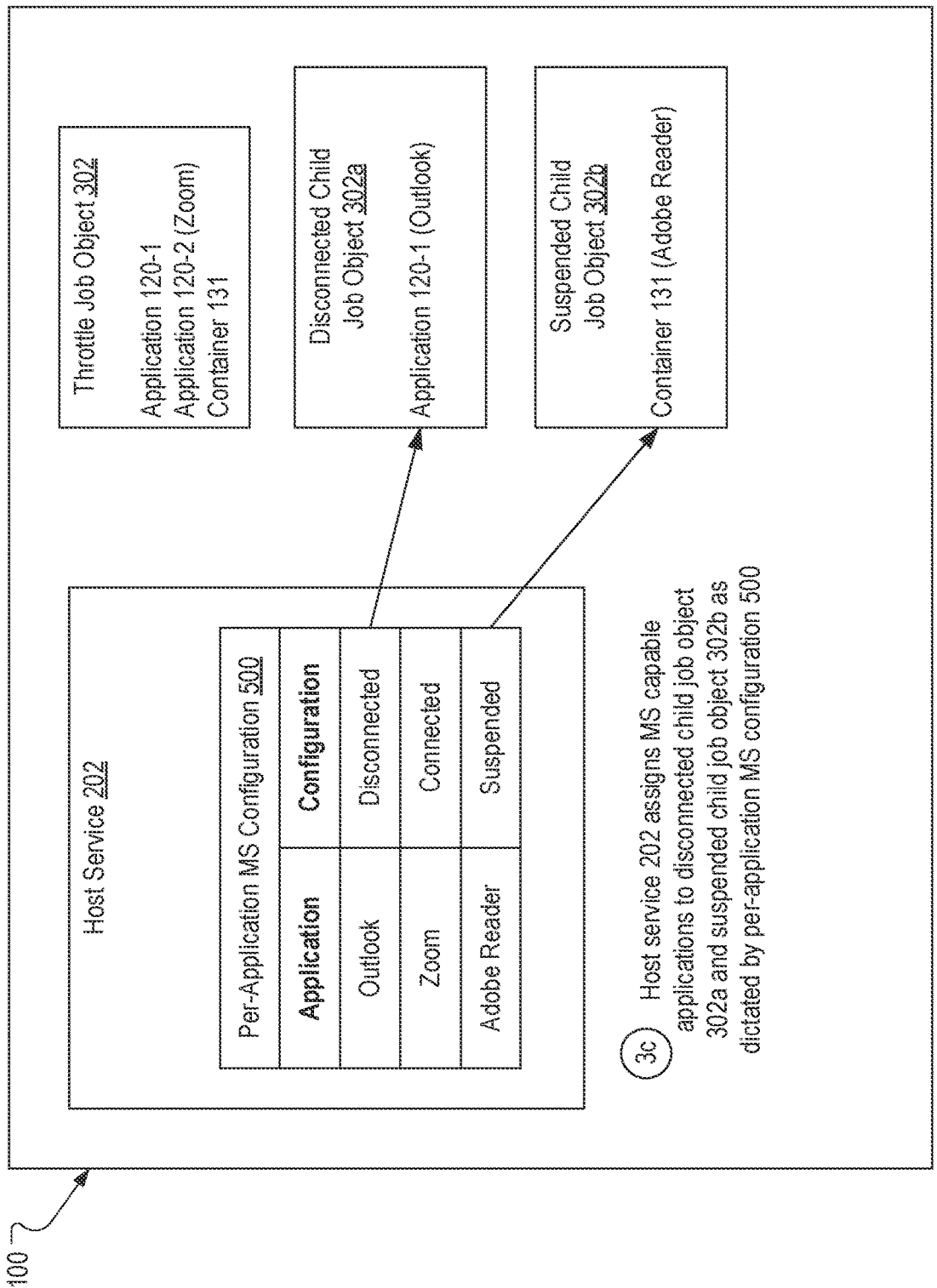

Turning to FIG. 5D, in step 3*c*, host service 202 can assign the MS-capable applications to disconnected child job object 302*a* or to suspended child job object 302*b* in accordance with per-application MS configuration 500. For example, because per-application MS configuration 500 defines the disconnected configuration for Outlook, host service 202 can assign Outlook (application 120-1) to disconnected child job object 302*a*. Similarly, because per-application MS configuration 500 defines the suspended configuration for Adobe Reader, host service 202 can assign Adobe Reader (application 120-3) to suspended child job object 302*b*. In contrast, because per-application MS configuration 500 defines the connected configuration for Zoom, host service 202 can forego assigning Zoom (application 120-2) to either disconnected child job object 302*a* or suspended child job object 302*b*. In other words, for any MS-capable application for which the connected configuration was selected, host service 202 can leave the application assigned to throttle job object 302. In some embodiments, host service 202 may assign an application to disconnected child job object 302*a* or to suspended child job object 302*b* by calling the AssignProcessToJobObject function.

In the example depicted in FIG. 5D, container 131 (or more particularly, the process ID of container 131) is assigned to suspended job object 302*b*. In such cases, container 131 would be "suspended" during Modern Standby. However, in some embodiments, it may not be desirable to assign container 131 to suspend child job object 302*b* (or to disconnected child job object 302*a*) such as when multiple applications may be running in container 131. In such cases, host service 202 may be configured to interface with container service 203 to cause container service 203 to implement the disconnected or suspended configuration within container 131 (or any other container in which container service 203 may be running). If the container is in the form of a virtual machine running a separate operating system, container service 203 may implement the disconnected or suspended configuration in a similar manner as host service 202 (e.g., by creating child job objects within the separate operating system environment). On the other hand, if the container is a software container (e.g., a Docker container), container service 203 can leverage available functionality to block a containerized application's network access or to limit the containerized application's CPU time.

As a result of the above-described process, during Modern Standby, any application assigned to disconnected child job object 302*a* will be prevented from accessing the network when it is active even though the operating system is implementing MCS. Accordingly, when such applications are active during MCS, they will function as if MDS were implemented. Also, any application assigned to suspended child job object 302*b* will be prevented from being scheduled on the CPU during Modern Standby. Accordingly, such applications will be treated as if they were assigned to suspend job object 301. On the other hand, any application in throttle job object 302 that is not assigned to either disconnected child job object 302*a* or suspended child job object 302*b* will function in accordance with MCS which the operating system is implementing.

In some embodiments, host service 202 can be configured to detect when system 100 is transitioning out of Modern Standby and, in response, can delete disconnected child job object 302*a* and suspended child job object 302*b* to thereby remove the limitations on the applications associated with such objects. Also, in some embodiments, host service 202 may communicate with container service(s) 203 to cause it/them to remove the disconnected and/or suspended configurations for any containerized applications.

The process represented in FIGS. 5A-5D may be repeated whenever system 100 is transitioning into Modern Standby. Accordingly, each time the operating system transitions system 100 into Modern Standby, host service 202 can dynamically determine which Modern Standby configuration (e.g., connected, disconnected or suspended) should be applied to each Modern Standby capable application (e.g., each application currently listed in throttle job object 302) using the current sensor state information and the applicable policy.

In some embodiments, host service 202 may be configured to adjust the Modern Standby configurations assigned to one or more applications while system 100 remains in Modern Standby. For example, EC service 204, which operates independent of the operating system, can provide sensor state information to host service 202 in response to a change in sensor state even when system 100 is in Modern Standby. As an example, if system 100 is in Modern Standby and the remaining battery charge crosses a threshold, a network disconnect or connect occurs, system 100 enters a new location, etc., EC service 204 can provide corresponding sensor state information to host service 202 (e.g., while host service 202 is active during Modern Standby). Host service 202 can then use the newly received sensor state information and the applicable policy to determine if any MS capable application should be moved to disconnected child job object 302a or suspended child job object 302b and can then make the appropriate updates.

As an example, if the remaining battery charge drops below a threshold, the applicable policy may dictate that additional Modern Standby capable applications should be assigned to suspended child job object 302b to preserve battery life. As another example, if the remaining battery charge increases above a threshold (e.g., when system 100 is plugged in and charging during Modern Standby), the applicable policy may dictate that no limitations should be placed on Modern Standby capable applications that were previously assigned to disconnected child job object 302a or suspended child job object 302b. In this way, host service 202 can leverage EC service 205 to dynamically adjust the per-application Modern Standby configurations while system 100 remains in Modern Standby.

The description above has used a number of Windows-based examples. However, the described functionality can also be implemented in other operating system environments. For example, on a system running a version of Unix or Linux, host service 202 could leverage sessions or cgroups as opposed to job objects to implement the described functionality. Therefore, for purposes of the claims, the term "job object" can include Windows job objects and the similar structures/functionality (e.g., sessions or cgroups) that other operating systems provide.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for applying Modern Standby configurations on a per-application basis, the method comprising:
    detecting that a system is transitioning into Modern Standby;
    in response to detecting that the system is transitioning into the Modern Standby, identifying a plurality of Modern Standby capable applications that are currently assigned to a throttle job object that the system employs to define which applications are to remain running at reduced activity during the Modern Standby;
    selecting a Modern Standby configuration for each of the plurality of Modern Standby capable applications that are currently assigned to the throttle job object including selecting, for each of the plurality of Modern Standby capable applications, from among a connected configuration, a disconnected configuration and a suspended configuration;
    creating a disconnected child job object and a suspended child job object under the throttle job object;
    setting a bandwidth limit for the disconnected child job object that prevents processes assigned to the disconnected child job object from using network bandwidth when such processes run at reduced activity during the Modern Standby;

setting a CPU limit for the suspended child job object that limits CPU time available to processes assigned to the suspended child job object when such processes run at reduced activity during the Modern Standby; and causing the selected Modern Standby configurations to be applied to the Modern Standby capable applications while the system is in the Modern Standby by:

applying the connected configuration to a first set of one or more of the Modern Standby capable applications by maintaining the assignment of the first set to the throttle job object to thereby allow the first set to remain running at reduced activity and to have network connectivity during the Modern Standby;

applying the disconnected configuration to a second set of one or more of the Modern Standby capable applications by maintaining the assignment of the second set to the throttle job object and assigning the second set to the disconnected child job object to thereby allow the second set to remain running at reduced activity but to not have network connectivity during the Modern Standby; and applying the suspended configuration to a third set of one or more of the Modern Standby capable applications by maintaining the assignment of the third set to the throttle job object and assigning the third set to the suspended child job object to cause the third set to remain running at reduced activity based on the CPU limit during the Modern Standby.

2. The method of claim 1, wherein the system is running one of:
a Windows operating system;
a Linux operating system; or
a Unix operating system.

3. The method of claim 1, wherein the Modern Standby configuration is selected for each of the plurality of Modern Standby capable applications based on a policy and sensor state information.

4. The method of claim 3, wherein the sensor state information is received from an embedded controller service that monitors one or more sensors of the system.

5. The method of claim 3, wherein the sensor state information comprises one or more of:
battery information;
network information; or
location information.

6. The method of claim 1, further comprising:
detecting that the system has exited the Modern Standby; and
in response to detecting that the system has exited the Modern Standby, causing the selected Modern Standby configurations to no longer be applied to the Modern Standby capable applications when the system exits Modern Standby.

7. The method of claim 1, wherein the Modern Standby capable applications include at least one containerized application, and wherein causing the selected Modern Standby configurations to be applied to the Modern Standby capable applications while the system is in Modern Standby comprises causing a container service to apply the selected Modern Standby configuration to the at least one containerized application.

8. The method of claim 1, further comprising:
detecting a change in sensor state information while the system remains in the Modern Standby;

selecting an adjusted Modern Standby configuration for at least one of the plurality of Modern Standby capable applications; and causing the selected adjusted Modern Standby configuration to be applied to the corresponding Modern Standby capable application while the system remains in Modern Standby.

9. The method of claim 6, wherein causing the selected Modern Standby configurations to no longer be applied to the Modern Standby capable applications when the system exits Modern Standby comprises deleting the disconnected child job object and the suspended child job object.

10. The method of claim 1, wherein the disconnected child job object and the suspended job object are created in response to detecting that the system is transitioning into the Modern Standby.

11. The method of claim 1, wherein setting the CPU limit for the suspended child job object comprises setting a CPU Rate member of a structure defining the suspended child job object to a minimum value.

12. One or more computer storage media storing computer executable instructions which when executed implement a method for applying Modern Standby configurations on a per-application basis, the method comprising:

identifying a plurality of Modern Standby capable applications that are running on a system and that are configured to remain running during Modern Standby;

in response to determining that the system is transitioning into the Modern Standby, selecting, based on sensor state information, Modern Standby configurations for the plurality of Modern Standby capable applications including a connected configuration for a first set of the Modern Standby capable applications, a disconnected configuration for a second set of the Modern Standby capable applications, and a suspended configuration fora third set of the Modern Standby capable applications;

causing the connected configuration, the disconnected configuration and the suspended configuration to be applied to the first set, the second set and the third set respectively while the system is in Modern Standby such that the connected configuration is applied to the first set to allow the first set to remain running and to have network connectivity during the Modern Standby, the disconnected configuration is applied to the second set to allow the second set to remain running but to not have network connectivity during the Modern Standby, and the suspended configuration is applied to the third set to cause the third set to be suspended during the Modern Standby;

while the system remains in the Modern Standby, receiving updated sensor state information;

in response to receiving the updated sensor state information, selecting, based on the updated sensor state information, the connected configuration for a fourth set of the Modern Standby capable applications, the disconnected configuration for a fifth set of the Modern Standby capable applications, and the suspended configuration for a sixth set of the Modern Standby capable applications; and causing the connected configuration, the disconnected configuration and the suspended configuration to be applied to the fourth set, the fifth set and the sixth set respectively while the system remains in the Modern Standby, wherein at least one of the fourth set, the fifth set, or the sixth set is different from the first set, the second set, or the third set respectively such that the Modern Standby configuration applied to at least one of the Modern Standby capable applications is dynamically adjusted during the Modern Standby based on the updated sensor state information.

13. The computer storage media of claim 12, wherein: causing the connected configuration, the disconnected configuration and the suspended configuration to be applied to the first and fourth sets, the second and fifth sets and the third and sixth sets respectively while the system is in Modern Standby comprises assigning the second and fifth sets to a disconnected child job object and assigning the third and sixth sets to a suspended child job object.

14. The computer storage media of claim 12, wherein the connected configuration, the disconnected configuration and the suspended configuration are selected for the first set, the second set and the third set respectively based on policy.

15. The computer storage media of claim 14, wherein the connected configuration, the disconnected configuration and the suspended configuration are selected for the fourth set, the fifth set and the sixth set respectively based on the policy.

16. The computer storage media of claim 12, wherein the sensor state information includes a remaining battery charge.

17. A system comprising:
one or more processors; and
computer storage media storing computer executable instructions which when executed implement a method for applying Modern Standby configurations on a per-application basis, the method comprising:
 detecting that a system is transitioning into Modern Standby;
 in response to detecting that the system is transitioning into the Modern Standby, identifying a plurality of Modern Standby capable applications that are currently assigned to a throttle job object that the system employs to define which applications are to remain running at reduced activity during the Modern Standby;
 selecting a Modern Standby configuration for each of the plurality of Modern Standby capable applications that are currently assigned to the throttle job object including selecting, for each of the plurality of Modern Standby capable applications, from among a connected configuration, a disconnected configuration and a suspended configuration;
 creating a disconnected child job object and a suspended child job object under the throttle job object;
 setting a bandwidth limit for the disconnected child job object that prevents processes assigned to the disconnected child job object from using network bandwidth when such processes run at reduced activity during the Modern Standby;
 setting a CPU limit for the suspended child job object that limits CPU time available to processes assigned to the suspended child job object when such processes run at reduced activity during the Modern Standby; and
 causing the selected Modern Standby configurations to be applied to the Modern Standby capable applications while the system is in the Modern Standby by:
  applying the connected configuration to a first set of one or more of the Modern Standby capable applications by maintaining the assignment of the first set to the throttle job object to thereby allow the first set to remain running at reduced activity and to have network connectivity during the Modern Standby;
  applying the disconnected configuration to a second set of one or more of the Modern Standby capable applications by maintaining the assignment of the second set to the throttle job object and assigning the second set to the disconnected child job object to thereby allow the second set to remain running at reduced activity but to not have network connectivity during the Modern Standby; and
  applying the suspended configuration to a third set of one or more of the Modern Standby capable applications by maintaining the assignment of the third set to the throttle job object and assigning the third set to the suspended child job object to cause the third set to remain running at reduced activity based on the CPU limit during the Modern Standby.

18. The system of claim 17, wherein the method further comprises:
deleting the disconnected child job object and the suspended child job object when the system exits the Modern Standby.

19. The system of claim 17, wherein the method further comprises:
while the system remains in the Modern Standby, receiving updated sensor state information;
in response to receiving the updated sensor state information, selecting, based on the updated sensor state information, the connected configuration for a fourth set of the Modern Standby capable applications, the disconnected configuration for a fifth set of the Modern Standby capable applications, and the suspended configuration for a sixth set of the Modern Standby capable applications; and
causing the connected configuration, the disconnected configuration and the suspended configuration to be applied to the fourth set, the fifth set and the sixth set respectively while the system remains in the Modern Standby, wherein at least one of the fourth set, the fifth set, or the sixth set is different from the first set, the second set, or the third set respectively such that the Modern Standby configuration applied to at least one of the Modern Standby capable applications is dynamically adjusted during the Modern Standby based on the updated sensor state information.

20. The system of claim 19, wherein the sensor state information includes a remaining battery charge.

* * * * *